United States Patent [19]

Hofmann et al.

[11] 4,252,386

[45] Feb. 24, 1981

[54] JOURNAL BEARING WITH AXIALLY SPLIT BEARING RINGS

[75] Inventors: Heinrich Hofmann, Schweinfurt; Johannes Brändlein, Euerbach; Günter Markfelder, Schweinfurt, all of Fed. Rep. of Germany

[73] Assignee: Kugelfischer Georg Schäfer & Co., Schweinfurt, Fed. Rep. of Germany

[21] Appl. No.: 84,197

[22] Filed: Oct. 12, 1979

[30] Foreign Application Priority Data

Oct. 14, 1978 [DE] Fed. Rep. of Germany ....... 2844842

[51] Int. Cl.³ ............................................. F16C 19/18
[52] U.S. Cl. .................................. 308/177; 308/196; 308/189 R; 308/233; 308/174
[58] Field of Search ................... 308/177, 196, 189 R, 308/233, 207 R, 230, 174, 176, 194

[56] References Cited

U.S. PATENT DOCUMENTS

| | | | |
|---|---|---|---|
| 2,627,120 | 2/1953 | Hotchkiss | 33/181 |
| 3,806,214 | 4/1974 | Keiser | 308/211 |
| 3,986,754 | 10/1976 | Torrant | 308/196 |
| 4,089,570 | 5/1978 | Markfelder et al. | 308/194 |
| 4,150,468 | 4/1979 | Harbottle | 308/196 |

*Primary Examiner*—Lenard A. Footland
*Attorney, Agent, or Firm*—Karl F. Ross

[57] ABSTRACT

A ball or roller bearing with two symmetrical halves, each designed to absorb both radial and axial stresses, comprises an axially split inner ring on a shaft and an axially split outer ring carried by a housing member coaxially surrounding the shaft. The inner ring halves form seats for respective rows of balls or rollers engaging contact zones on the inner peripheral surfaces of the outer ring halves that are offset from these seats in either an axially inward or an axially outward direction. In the first instance, the housing member has an annular disk received in an annular recess or groove of the same axial width which is formed by two confronting peripheral rabbets on the outer ring halves; in the second instance the inner ring halves are rabbeted to form an annular recess or groove receiving an axially coextensive peripheral rib on the shaft. In either case, the two rabbeted ring halves are axially separated by a small gap.

4 Claims, 2 Drawing Figures

JOURNAL BEARING WITH AXIALLY SPLIT BEARING RINGS

FIELD OF THE INVENTION

Our present invention relates to a journal bearing with rotary bodies in the shape of rollers or balls—preferably the latter—interposed between a shaft member and a coaxial housing member to facilitate relative rotation while absorbing both radial and axial stresses.

BACKGROUND OF THE INVENTION

Assemblies of this type are described, for example, in U.S. Pat. Nos. 2,627,120 and 3,806,214. The bearings shown in these prior patents have inner and outer raceways formed by respective bearing rings or sleeves each split into two mutually symmetrical, generally cup-shaped halves to facilitate their emplacement. With a so-called "O" mounting (see also commonly owned U.S. Pat. No. 4,089,570), each set of rotary bodies engages respective halves of the two bearing rings along axially offset contact zones so as to define two sets of seat axes which converge in a radially outward direction; with an "X" mounting these seat axes converge toward the shaft axis. The "O" mounting exerts an axial thrust upon the two halves of the outer bearing ring in a sense urging them toward each other. This thrust can be utilized, as described in the two first-mentioned prior patents, to clamp an annular housing flange between the two outer ring halves for holding the assembly in position.

The presence of such a housing flange, which must have a certain axial width in order to exhibit the necessary structural strength, requires a corresponding separation of the halves of the outer bearing ring so as to increase the overall axial extent of the bearing if the width of the outer raceways is to be maintained. For the sake of stability, moreover, the housing member carrying the flange must be axially enlarged on both sides thereof to form a radial abutment for the halves of the outer bearing ring.

OBJECT OF THE INVENTION

The object of our present invention, therefore, is to provide a more compact assembly of the general type referred to above.

SUMMARY OF THE INVENTION

In accordance with our present invention, adjoining end faces of the two halves of the outer bearing ring are provided with confronting peripheral rabbets defining an annular recess or groove accommodating an annular disk of the same axial width which is rigid with a surrounding housing member. These adjoining end faces are separated, inwardly of that recess, by a gap which is substantially smaller than the axial width of the recess and the disk. Except for this small gap, which the thrust exerted by the rotary bodies tends to narrow, the split outer bearing ring may be regarded as geometrically continuous.

We may also reverse the aforedescribed arrangement by rabbeting the halves of the inner instead of the outer bearing ring and introducing an annular rib on the shaft member into the resulting annular recess or groove, again with formation of a small gap between the adjoining end faces of these ring halves. In that instance the "O" mounting is replaced by an "X" mounting, as known per se from the aforementioned commonly owned U.S. Pat. No. 4,089,570.

In general terms, therefore, our invention provides for an annular web on one of the two coaxial members received in an annular recess formed by the rabbeted halves of the bearing ring carried on that member.

BRIEF DESCRIPTION OF THE DRAWING

The above and other features of our present invention will now be described in detail with reference to the accompanying drawing in which.

SPECIFIC DESCRIPTION

Figure 1:
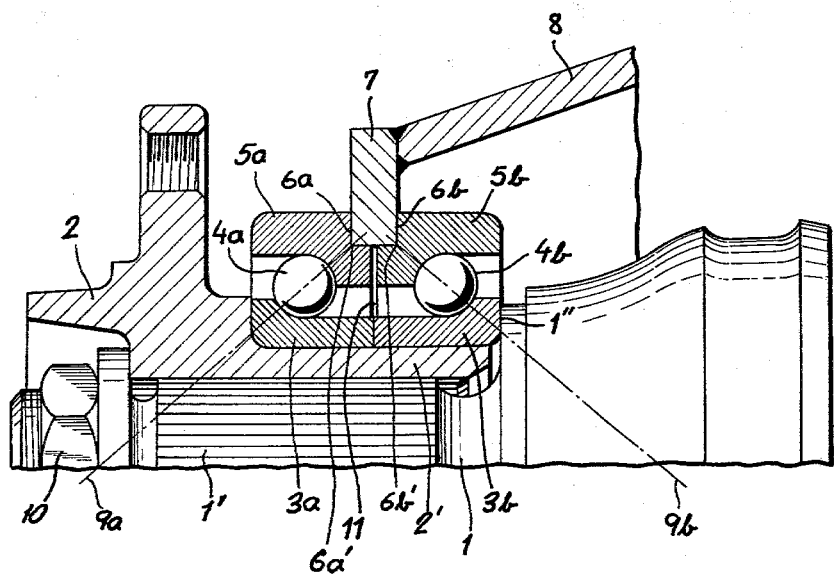
FIG. 1 is an axial sectional view of a representative portion of a journal bearing according to our invention.

In FIG. 1 we have illustrated a shaft 1, which may be a wheel axle of an automotive vehicle, having a splined portion 1' engaged by a complementarily splined tubular boss 2' integral with a wheel hub 2. Boss 2' carries an inner bearing ring, split into two closely adjoining halves 3a and 3b, which form raceways for two sets of bearing balls 4a and 4b. An outer bearing ring engaged by these balls is split into two halves 5a and 5b separated by a small gap 11. The adjoining end faces of ring halves 5b and 5b are rabbeted at 6a and 6b to form an annular peripheral recess which is occupied by an annular disk or flat ring 7 of the same axial width welded to a stationary housing member 8. A nut 10 is screwed onto the threaded tip of shaft 1 to lock the hub 2 and, with it, the inner bearing ring 3a, 3b in place against a shoulder 1" of the shaft.

Oblique lines 9a and 9b, passing through the centers of balls 4a and 4b, represent respective seat axes, or lines of thrust, as described in commonly owned U.S. Pat. No. 4,089,570. These seat axes are seen to pass through the inner boundaries 6a', 6b' of the recess 6a, 6b so as to intersect within that recess, thereby insuring a load transfer free from bending moments to the housing disk 7.

Figure 2:
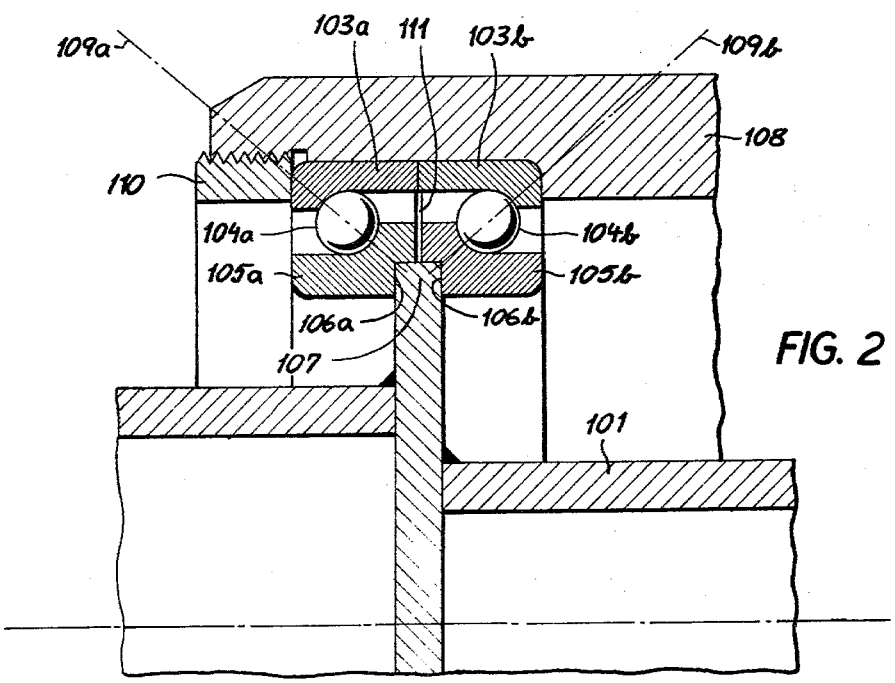
FIG. 2 is a similar view showing a modification.

In FIG. 2 we have shown a shaft 101 coaxially surrounded by a housing sleeve 108 to which the two halves 103a, 103b of an outer bearing ring are clamped by an annular nut 110. The corresponding inner bearing ring is split into halves 105a, 105b which are axially separated by a gap 111 and are rabbeted at 106a, 106b to form an inner peripheral recess or groove occupied by an annular rib 107 integral with shaft 101. Seat axes 109a and 109b, passing through the centers of bearing balls 104a and 104b, converge inside the recess 106a, 106b.

The closely adjoining bearing-ring halves 3a, 3b or 103a, 103b not be in direct contact with each other, as shown, but could be separated by an interposed annular spacer as described in the aforementioned prior U.S. Pat. No. 2,627,120.

It will be noted that the annular web or disk 7 penetrates fully into the associated recess 6a, 6b, coming to rest against the bottom thereof whose radius is only slightly greater than that of the raceways formed by the bearing ring 5a, 5b. Thanks to this tight interengagement, there is no need for expanding the disk 7 laterally along the outer periphery of the bearing ring.

Naturally, the balls 4a, 4b and 104a, 104b (or equivalent rollers) can be held mutually separated by conventional cages which have not been illustrated.

As clearly shown in the drawing, web 7 or 107 constitutes the only means for absorbing the radial and axial forces exerted by the rotary bodies 4a, 4b or 104a, 104b upon the split bearing race 5a, or 105a, 105b.

We claim:

1. In an assembly of a shaft member and a housing member coaxially surrounding same, the combination therewith of a journal bearing comprising an inner bearing ring carried on said shaft member, an outer bearing ring carried on housing member, each of said bearing rings being axially split into two mutually symmetrical halves, and two axially spaced sets of rotary bodies seated between said bearing rings, one of said members being provided with an annular web received in an annular recess of the same axial width formed by confronting peripheral rabbets on adjoining end faces of the halves of the bearing ring carried on said one of said members, said adjoining end faces being separated beyond said recess by a gap substantially smaller than said axial width, each set of rotary bodies engaging respective halves of said bearing rings along axially offset contact zones with exertion of a thrust tending to narrow said gap.

2. The combination defined in claim 1 wherein said rotary bodies are balls, said contact zones defining seat axes which pass through the centers of the balls of said sets and converge within said recess.

3. The combination defined in claim 1 or 2 wherein said web is an annular disk on said housing member, said recess being formed between the halves of said outer bearing ring.

4. The combination defined in claim 1 or 2 wherein said web is an annular rib on said shaft member, said recess being formed between the halves of said inner bearing ring.

* * * * *